(12) United States Patent
Pavlak

(10) Patent No.: US 7,936,078 B2
(45) Date of Patent: May 3, 2011

(54) VARIABLE SPEED WIND TURBINE HAVING A CONSTANT SPEED GENERATOR

(76) Inventor: Alexander J. Pavlak, Severna Park, MD (US)

( * ) Notice: Subject to any disclaimer, the term of this patent is extended or adjusted under 35 U.S.C. 154(b) by 308 days.

(21) Appl. No.: 12/401,978

(22) Filed: Mar. 11, 2009

(65) Prior Publication Data

US 2010/0230966 A1    Sep. 16, 2010

(51) Int. Cl.
*F03D 9/00* (2006.01)
(52) U.S. Cl. ............................................. 290/44; 290/55
(58) Field of Classification Search ............... 290/44, 290/55
See application file for complete search history.

(56) References Cited

U.S. PATENT DOCUMENTS

| 5,083,039 | A | 1/1992 | Richardson et al. | |
| 7,042,110 | B2 * | 5/2006 | Mikhail et al. | 290/44 |
| 7,808,126 | B2 * | 10/2010 | Stiesdal | 307/84 |

* cited by examiner

*Primary Examiner* — Tho D Ta
(74) *Attorney, Agent, or Firm* — Laubscher & Laubscher, PC

(57) ABSTRACT

A variable speed wind turbine including a variable speed rotor, a large constant speed generator, and a small variable speed generator is characterized by a three-shaft variable ratio gearbox connecting the shaft of the rotor with the two generator shafts. The variable ratio gearbox is an epicyclic gearbox which enables the combination of the high performance of a variable speed rotor with the low cost of a large constant speed generator. The torque of the small variable speed generator controls the rotor speed. Variable frequency power conditioning cost is less than that of a prior art variable speed wind turbine, reduced by the ratio of the rated capacity of the small generator to total rated capacity. Also, the small generator enables efficient low wind velocity energy capture. The low rotational inertia of the small variable speed generator further reduces drive train dynamic stress.

15 Claims, 7 Drawing Sheets

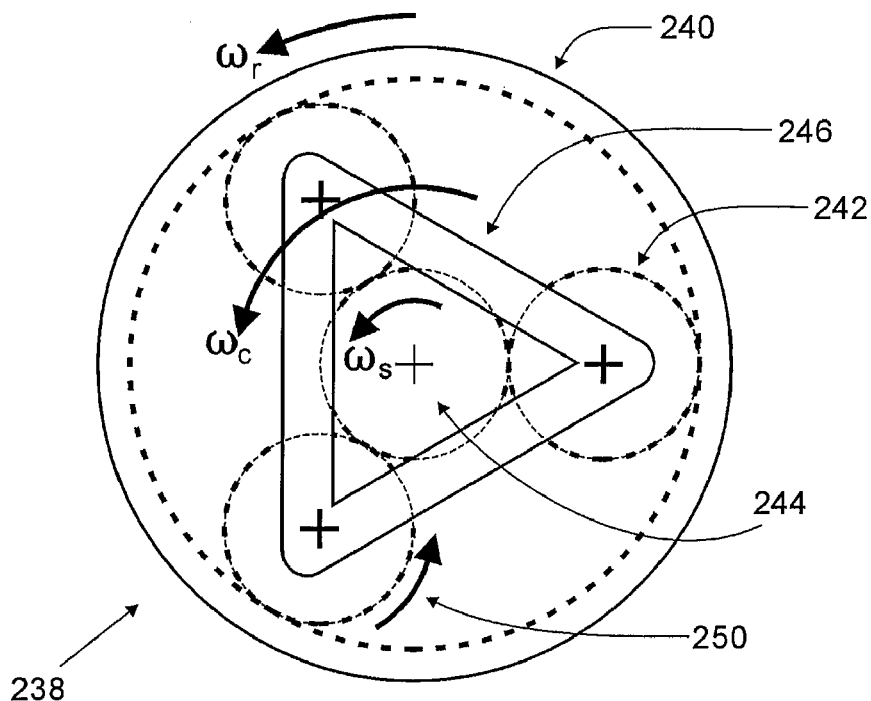
Fig. 4
(prior art)
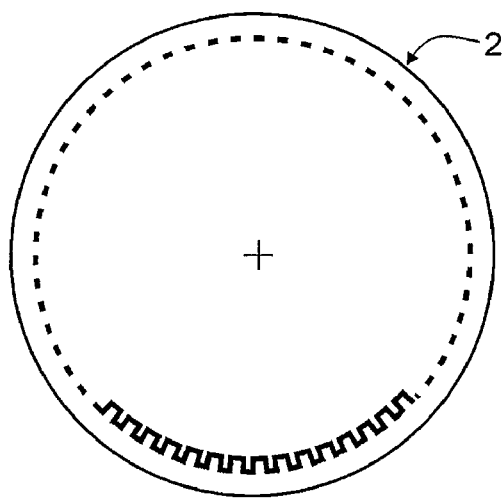 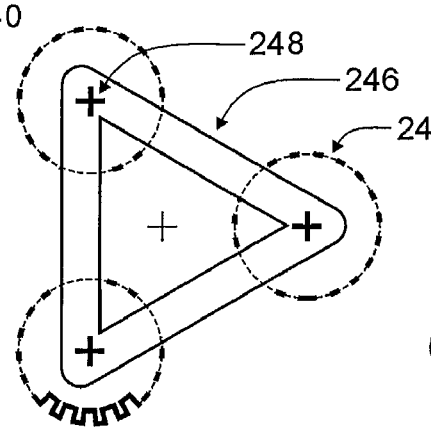 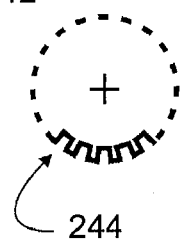
Fig. 5A　　　　Fig. 5B　　　Fig. 5C

VARIABLE SPEED WIND TURBINE HAVING A CONSTANT SPEED GENERATOR

BACKGROUND OF THE INVENTION

The present invention relates to an improved horizontal axis wind turbine for generating alternating current electricity which can be supplied to an electrical power grid.

Wind turbines can be broadly classified as either constant speed or variable speed. Each category has its own strengths and weaknesses. The present invention utilizes a three-shaft variable ratio gearbox to exploit the advantages of a variable speed rotor yet retains the lower cost of a constant speed generator producing most of the output power.

BRIEF DESCRIPTION OF PRIOR ART

A typical megawatt sized constant speed wind turbine operates at 20 rpm rotor speed and includes a fixed speed generator driven by the rotor via a fixed ratio gearbox. Typical generators are two poles, 60 Hz, 1800 rpm. The gearbox has a 90:1 fixed ratio. This is typically accomplished in several stages with fixed ratio planetary gears.

As wind velocity increases from zero, the rotor begins to turn. Initially, the electrical power system is disconnected and thus produces no power. Once the rotor reaches its design rotation speed, such as 20 rpm, the power system is engaged and the generator begins to provide power to the grid. As wind velocity continues to increase, the rotation speed of the rotor and the generator remains essentially constant, synchronized to the grid frequency. As wind velocity increases further, torque increases; thereby increasing generator power output. When the power output reaches the rated power for that generator, a pitch control system adjusts the pitch of the rotor blades to limit the wind power converted to rotational power, and the system produces constant rated electrical power. At very high wind velocity, pitch control shuts the system down.

The power produced by a rotor at wind velocity V is given by:

$$P_r = 0.5 \rho_a C_p \pi R^2 V^3 \qquad 1$$

where:
$\rho_a$=atmospheric density
$C_p$=power coefficient
R=radius of the rotor disk A given rotor will produce maximum power, i.e. constant maximum $C_p$, if its rotation speed $\omega$ is proportional to wind velocity. Accordingly, at maximum power:

$$P_r = \omega K \omega^2$$

$$P_r = \omega \tau$$

$$\tau = K \omega^2$$

where $\tau$ is torque and K represents those constants in equation 1 that characterize a given rotor.

Power is known to be the product of shaft rotation speed $\omega$ and torque $\tau$, so the torque required to provide maximum power for a variable speed turbine is given by equation 2. If there were no torque, the rotor would over-speed. For a given wind rotor to produce maximum power, shaft rotation is proportional to wind velocity and torque in the rotor shaft must be controlled according to equation 2.

As with constant speed turbines, the rotor of a variable speed wind turbine is connected to a generator through a fixed ratio gearbox. In all variable speed generators, the speed of the rotor, the speed of the generator and the frequency of generated AC electricity all vary in direct proportion to wind velocity.

Variable speed wind turbines employ a power converter to convert the variable frequency AC power output to the constant frequency of the electrical grid. A common solution is disclosed in the Richardson et al U.S. Pat. No. 5,083,039. A rectifier is provided to convert variable frequency AC output to DC and an inverter is used to convert the DC power to AC at the grid frequency. Richardson also discloses how the rectifier and inverter in combination can control generator torque by controlling the electrical load as seen by the variable speed generator. For drive trains with fixed ratio gearboxes, generator torque controls the rotor speed according to equation 2. A controller is provided to sense the wind velocity and set the torque so that rotor speed increases in direct proportion to the wind velocity. By this method, the rotor blade always operates at peak power coefficient or peak efficiency. A properly controlled variable speed rotor will capture more energy at any wind velocity than a fixed speed rotor.

High wind velocities are uncommon and it is not economical to employ very large generators to capture that energy. Therefore, both constant speed and variable speed wind turbines are designed to have a rated wind velocity at which point the generator produces its maximum rated power. At wind velocities above the rated wind velocity, the wind turbine produces constant rated power by using a pitch control system for the rotor blades. Each rotor blade has an actuator in the rotor hub. As wind velocity approaches the rated velocity for the turbine, a pitch control system causes the actuators to rotate the turbine blades about their axes to change the angle of attack and limit power by reducing lift. As wind velocity increases above the rated velocity, the pitch control system holds the captured wind energy constant.

All wind turbines have a cut out wind velocity at which point the wind turbine is shut down to prevent damage. As wind velocity reaches the cut out wind velocity, the pitch control system feathers the blades, thereby reducing torque to zero and shutting down the turbine.

For constant speed turbines, the generator shaft speed is resistant to speed changes and wind gusts can impose high torque fluctuations. A pitch control system can partially compensate for these torque fluctuations.

Variable speed wind turbines have certain advantages over constant speed wind turbines. They capture more energy at any wind velocity than is captured by fixed speed rotors. By setting the optimum rotor speed, a variable speed wind turbine captures 5-10% more energy. Because of lower fluctuating loads, wind gusts are translated into rotor accelerations and rotor kinetic energy rather than torque variations. The higher rated wind velocities result in a 25-30% reduction in nominal shaft torque. In addition, the lower shaft torque results in lower overall loads and lighter structures. This is a major advantage. Variable speed wind turbines also produce less noise at lower wind velocity. With a synchronous generator and ohmic resistance, a variable speed generator can provide electronic braking.

However, there are certain disadvantages to variable speed wind turbines. The main disadvantage is the high cost of the rectifier/inverter power electronics. Another disadvantage is that power electronics are less than 100% efficient, which increases system losses.

Prior efforts to combine variable speed rotors with constant speed generators have focused on using a two-shaft continuously variable gearbox wherein one shaft is connected to the rotor and the second shaft is connected to the generator. Two-shaft continuously variable ratio gearboxes have been constructed using belts, hydraulics and frictional couplings. Variable ratio gearboxes that rely on frictional coupling cannot reliably survive the high torques involved with heavy-duty generators. Two-shaft continuously variable gearboxes have not resulted in successful wind turbine products.

The present invention was developed in order to overcome these and other drawbacks by providing an improved variable speed wind turbine.

SUMMARY OF THE INVENTION

Accordingly, it is a primary object of the invention to provide a variable speed wind turbine including a rotor including a hub having a longitudinal axis and a plurality of blades connected with and extending radially from the hub. A rotor shaft is connected with the hub and is driven for rotation by the rotor in response to wind striking the rotor blades. A variable ratio gearbox is connected with the rotor shaft and has first and second outputs which rotate at speeds which are not in fixed proportion to the speed of rotation of the rotor shaft. A fixed speed generator is connected with the first output of the variable ratio gearbox and a variable speed generator is connected with the second output of the variable ratio gearbox. The generators produce electrical outputs which are supplied to an electric grid.

According to another object of the invention, a power converter comprising a rectifier and inverter is connected with the output of the variable speed generator to convert the electrical output from the variable speed generator to match the frequency of the grid. The power converter further controls the torque of the variable speed generator, thereby controlling rotor speed.

According to another object of the invention, first and second brakes are connected with the rotor shaft and with the input to the fixed speed generator, respectively. A brake controller is connected with the wind velocity detector to control the operation of the first and second brakes. The first brake is released when the wind velocity reaches a first level and the second brake is released when the wind velocity reaches a second level greater than the first level.

The variable ratio gearbox includes and epicyclical gearbox including a sun gear, a ring gear, and a plurality of equally spaced planetary gears arranged between the sun and ring gears. A carrier connects the shafts of the planetary gears. In one embodiment, the carrier is connected with the rotor shaft, the ring gear is connected with the variable speed generator and the sun gear is connected with the fixed speed generator. In an alternate embodiment, the ring gear is connected with the rotor shaft, the sun gear is connected with the variable speed generator and the carrier is connected with the fixed speed generator. In a further alternate embodiment, the ring gear is connected with the rotor shaft, the sun gear is connected with the fixed speed generator, and the carrier is connected with the variable speed generator.

At low wind velocity, the variable speed generator produces all of the power. The larger constant speed generator is disengaged and the wind turbine rotor speed is set at optimum speed by controlling the torque of the variable speed generator. At intermediate wind velocities, the rotor turns at a variable optimum speed and the variable ratio gearbox splits the power load between both generators. At wind velocities above the rated wind velocity, the rotor turns at constant speed, as with all wind turbines, and both generators produce power in proportion to their rated capacity.

BRIEF DESCRIPTION OF THE DRAWINGS

Other objects and advantages of the invention will become apparent from a study of the accompanying drawing when viewed in the light of the accompanying drawing, in which:

FIG. 4 is a schematic diagram of an epicyclic gearbox according to the prior art;

FIGS. 5A, B, and C are plan views of a ring gear, planetary gears, and sun gear, respectively, of the epicyclic gearbox of FIG. 4.

DETAILED DESCRIPTION OF THE INVENTION

Figure 1:
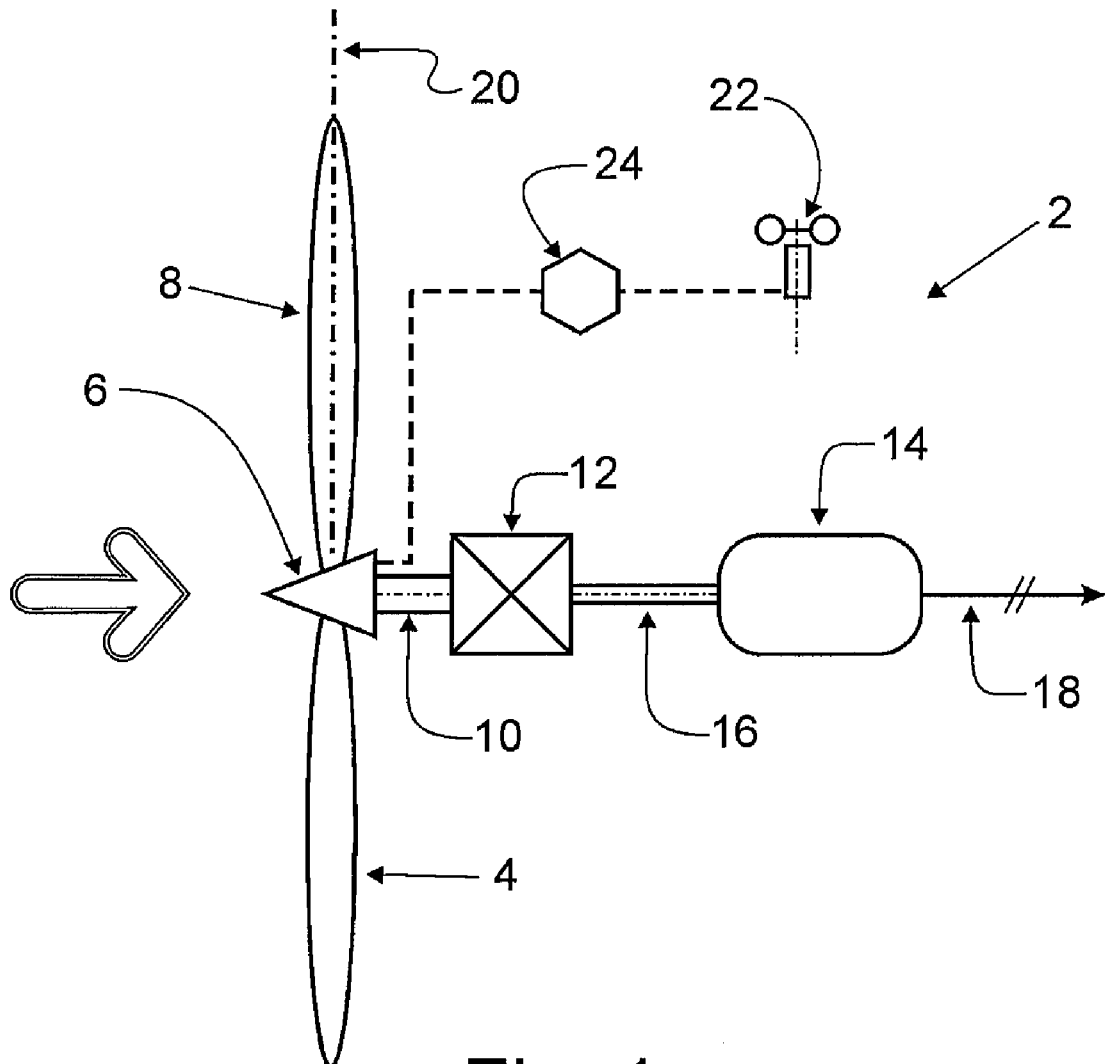
FIG. 1 is a schematic diagram of a constant speed wind turbine drive train according to the prior art.

Referring first to FIG. 1, there is shown the power train 2 for a constant speed wind turbine according to the prior art. The power train includes a wind driven rotor 4 including a hub 6 and a plurality of blades 8 extending radially therefrom. A low speed high torque rotor shaft 10 is connected at one end with the hub and at the other end with a fixed ratio gearbox 12. The gearbox drives a generator 14 through a high speed low torque shaft 16. The generator provides constant frequency AC power directly to an electrical grid 18.

Each rotor blade 8 has an axis 20 colinear with a radial line from the hub 6. The blades 8 are rotatable about their axes in accordance with wind velocity. For this purpose, the turbine includes a wind velocity detector 22 and a blade pitch control system 24.

Figure 2:
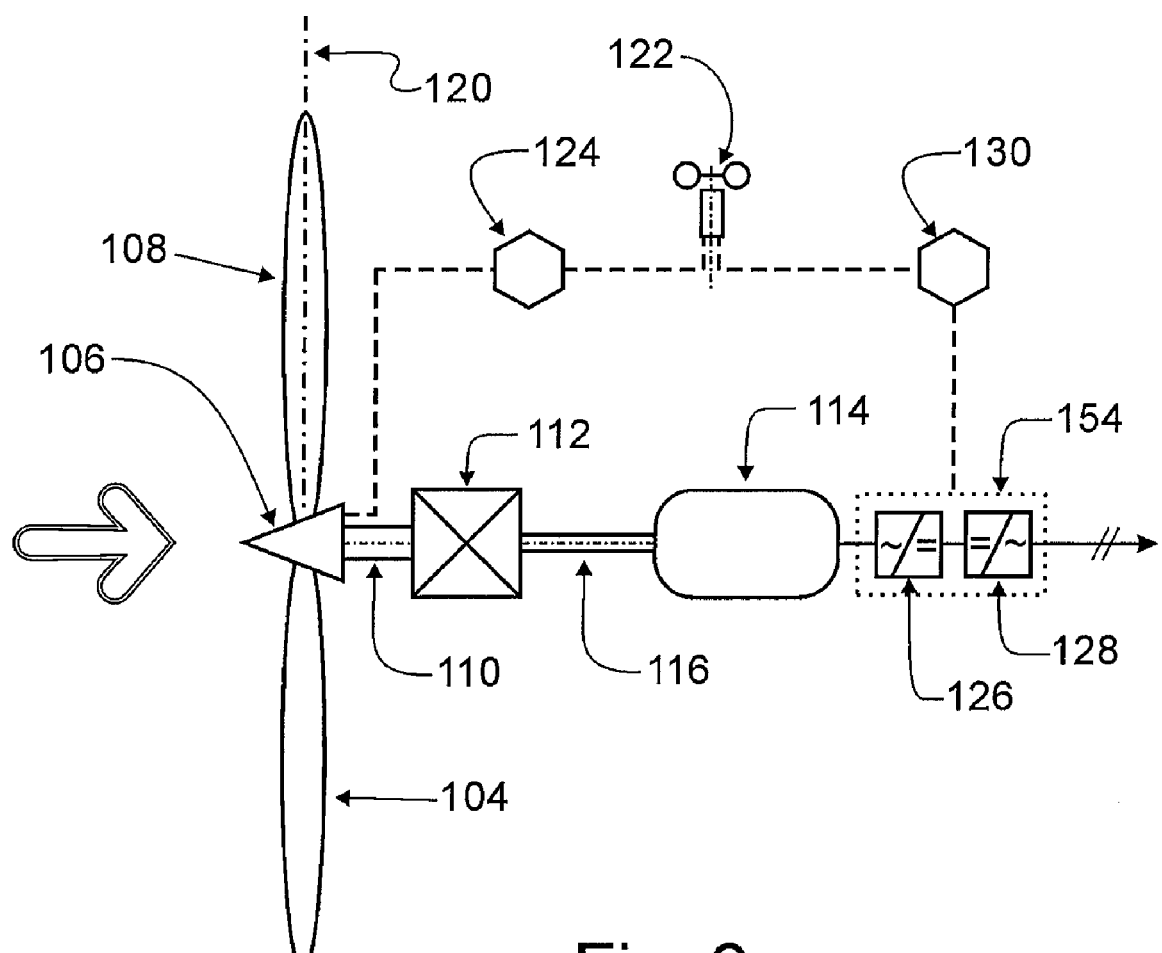
FIG. 2 is a schematic diagram of a variable speed wind turbine drive train according to the prior art.

FIG. 2 shows the power train for a prior art variable speed wind turbine. As with constant speed turbines, the rotor 104 includes a hub 106 and a plurality of blades 108 each having an axis 120. The rotor hub is connected to a generator 114 through a fixed ratio gearbox 112 and shafts 110 and 116. A wind velocity detector 122 provides a wind velocity signal to a blade pitch control system 124. With variable speed generators having fixed ratio gearboxes, the speed of the rotor, the speed of the generator and the frequency of generated AC electricity all vary in direct proportion to wind velocity. Thus, variable speed wind turbines need to convert the variable frequency AC power output from the generator 114 to the constant frequency of the electrical grid. A power converter 154 is provided for this purpose. The power converter 154 comprises a rectifier 126 connected with the output of the generator 114 to convert variable frequency AC output to DC, followed by an inverter 128 connected with the rectifier to convert the DC power to AC at the grid frequency. A controller 130 provides the power converter with a signal to control the electrical load seen by the variable speed generator 114. This controls the torque of the generator, thereby controlling the rotor speed.

Traditional electric power utilities use large synchronous generators. They are simple, robust, efficient, and inexpensive. However, they are difficult to use for fixed speed wind turbine systems because torque fluctuations cause the generator to lose synchronization. In the event of grid failure, synchronous generators in conjunction with ohmic resistors can provide electric braking. Fixed speed wind turbines generally use asynchronous or induction generators. Induction generators have a rotational slip of a few percent meaning that the shaft speed is a few percent different that the rotational speed calculated from the grid frequency. Slip introduces compliance that can absorb some torque fluctuations. There are designs that can provide +/−30% slip. One disadvantage is that slip generates heat that must be removed and which reduces efficiency. There are many variations of synchronous and asynchronous generators. Conventional variable speed wind turbines use either synchronous or asynchronous generators whereas conventional fixed speed wind turbines use only asynchronous generators.

Generators are usually designed to operate best at full rated power and are inefficient at low power levels. One approach to compensate for this is to use multiple generators, often of different types, with fixed ratio gearing. Sometimes two generators share the same shaft. The net effect is an improved electrical generator. Another approach for generating constant frequency power from a variable speed shaft is to rotate the generator stator as well as the rotor so that the rotational difference between the rotor and stator corresponds to constant grid frequency. A disadvantage of using multiple generators is that two generators generally cost more than a single generator of the same power capacity.

The present invention uses a variable ratio gearbox to combine the performance advantages of a variable speed rotor with the low cost and simplicity of a large constant speed generator.

Figure 3:
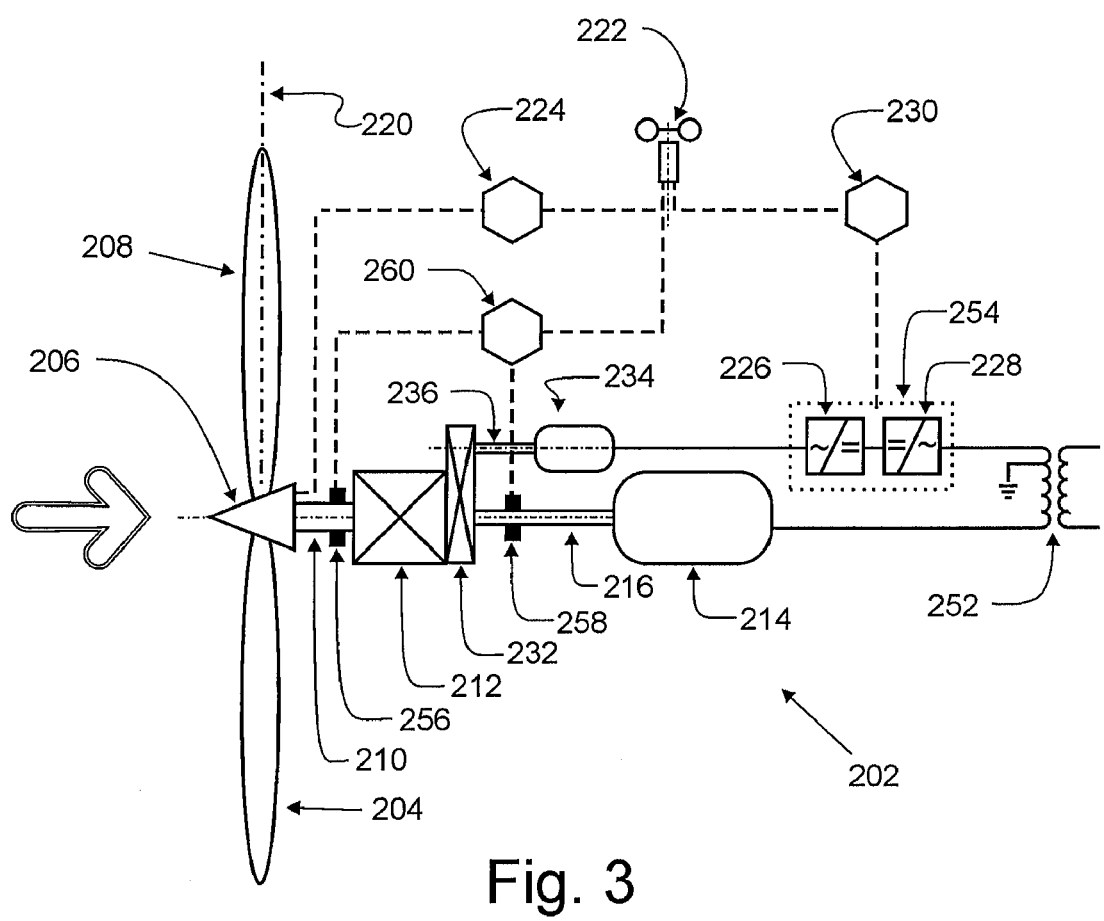
FIG. 3 is a schematic diagram of a variable speed wind turbine according to the present invention.

Referring to FIG. 3, a preferred embodiment of the variable speed wind turbine 202 according to the invention will be described. The wind driven rotor 204 includes a hub 206 having a longitudinal axis and a plurality of blades 208 connected with and extending radially from the hub. A rotor shaft 210 drives a conventional fixed ratio gearbox 212. As will be developed below, the output from the fixed ratio gearbox drives a variable ratio gearbox 232. In a preferred embodiment, both gearboxes are arranged in a common housing (not shown) with the variable ratio gearbox 232 as the last stage of the fixed ratio gearbox.

The variable ratio gearbox 232 has first and second outputs and thus splits the power between a large constant speed generator 214 driven by a shaft 216 from the first output of the variable ratio gearbox and a small variable speed generator 234 driven by a shaft 236 from the second output of the variable ratio gearbox.

The variable speed generator 234 produces power at frequencies that must be converted into fixed frequency power to interface with the electric grid. A power converter 254 is provided at the output of the variable speed generator. The power converter comprises a rectifier 226 which converts variable frequency AC to DC and an inverter 228 which converts DC to AC at the grid frequency. A controller 230 uses wind velocity data from the wind velocity detector 222 to signal the power converter 254 to set the torque on the variable speed generator 234. Setting the torque controls the speed of the rotor 204.

The preferred embodiment of the variable ratio gearbox 232 is an epicyclical gearbox 238 which is shown in FIG. 4. It comprises a ring gear 240 shown in more detail in FIG. 5A, a plurality of planetary gears 242 shown more particularly in FIG. 5B, and a sun gear 244 shown more particularly in FIG. 5C. The planetary gears are interconnected via a carrier assembly 246 which holds all of the planetary gears together so that the planetary centers 248 rotate as a unit.

The shaft rotations of interest are the ring gear rotation $\omega_r$; the carrier rotation $\omega_c$; and sun gear rotation $\omega_s$. The planetary gears also rotate as indicated by the arrow 250 in FIG. 4 but they are tied to a shaft through the carrier and the shaft rotation rates are of interest in the analysis set forth below.

The gearbox of FIG. 4 is called an epicyclical gearbox because if one follows a mark on a planetary gear it traces out what mathematicians call an epicycloid. FIG. 4 is also called a planetary gearbox though the word planetary is a more general term that also includes gearboxes like the differential in an automotive rear axle.

The following equation describe shaft rotations for the epicyclical gearbox:

$$(2+n)\omega_r + n\omega_s - 2(1+n)\omega_c = 0 \qquad 3$$

where n is the ratio of sun gear/planet gear pitch diameters.

From equation 3 it is clear that if any one shaft is clamped and thus prevented from rotating, then the other two shafts have a fixed speed ratio. Clamping one shaft turns a variable ratio gearbox into a fixed ratio gearbox. Most prior art wind turbine gearboxes are variations of clamped epicyclical gearboxes and are often referred to as planetary gearboxes.

Equation 1 can be rewritten as:

$$\omega_r/\omega_s = n/[2(1+n)\omega_c/\omega_r - (2+n)] \qquad 4$$

The equation describes a variable ratio gearbox because the ratio $\omega_r/\omega_s$ will vary depending on how the ratio $\omega_c/\omega_r$ is set. If the ratio $\omega_c/\omega_r$ is set so that the bracketed term approaches zero, the ratio $\omega_r/\omega_s$ approaches infinity resulting in what is often referred to as an infinitely variable gearbox.

For the example shown in FIG. 4, the sun gear and planet gears are the same size so n=1 and equation 3 becomes:

$$3\omega_r + \omega_s - 4\omega_c = 0 \qquad 5$$

There are six possible ways to connect the epicyclical gearbox shafts for the ring gear, the sun gear and the carrier to the two generators and the rotor. The following designations are used in the discussion set forth below:

$\omega_1$ as the speed of the fixed speed generator shaft,
$\omega_2$ as the speed of the variable speed generator shaft
$\omega_3$ as the speed of the wind driven shaft at the output of the fixed ratio gearbox 212 in FIG. 3.

High-speed low-torque operation of the variable speed generator can be obtained if the ring gear is connected with the variable speed generator shaft, the sun gear is connected with the fixed speed generator shaft and the carrier shaft is connected with the wind driven rotor shaft. For n=1, the gear ratio equation 3 becomes:

$$3\omega_2 + \omega_1 - 4\omega_3 = 0 \qquad 6$$

Another combination that has even better high-speed low-torque characteristics is to connect the ring gear to the rotor shaft, the sun gear to the variable speed generator and the carrier shaft to the fixed speed generator. However, in this configuration the direction of the variable speed generator rotation changes between low wind velocity single generator operation and high wind dual generator operation.

A third workable combination is to connect the ring gear to the wind rotor shaft, the sun gear to the fixed speed generator, and the carrier to the variable speed generator. This combination results in moderately high variable generator shaft torque when the variable speed generator is operating alone. Changing the pitch diameter ratio n reduces this torque.

The pitch diameter ratio n also affects the relationship between shaft speed and torque, though this relationship is generally secondary to connecting the appropriate gears to the appropriate shafts.

The other three combinations of epicyclical gearbox shafts and generator/rotor shafts result in unacceptably high torque for the variable speed generator.

Another constraint is power conservation. If $\tau$ is the shaft torque, power $P=\omega\tau$. Power conservation means:

$$P_1+P_2+P_3=0$$

$$\omega_1\tau_1+\omega_2\tau_2+\omega_3\tau_3=0 \quad\quad 7$$

The third constraint is to control the power ratio for the two generators. There are two approaches for providing such control.

One approach is to control the power ratio by connecting a transformer 252 with the outputs of the generators as shown in FIG. 3 and adjusting the turns ratio of the transformer. For example, the ground tap on the primary side of the transformer 252 can be set to provide a 4:1 turns ratio between the fixed speed generator 214 and the smaller variable speed generator 234. For the variable speed generator 234, the torque is known and for the fixed speed generator 214 the speed is known. Since speed corresponds to voltage and torque corresponds to current, then setting the turns ratio (voltage ratio) also sets the power ratio.

In the following example it is assumed that the power ratio is 4:1. When both generators are operating, the fixed speed generator provides 80% of power and the variable speed generator provides 20% of power.

$$P_1/P_2=4$$

$$P_1-4P_2=0$$

$$\omega_1\tau_1-4\omega_2\tau_2=0 \quad\quad 8$$

Another approach to control the power ratio is to use a power converter 254 formed from the inverter 226 and rectifier 228 to control both the torque and speed of the variable generator based on wind velocity. Equation 8 and the turns ratio approach will be used for the following example.

Equations 6, 7 and 8 comprise three independent equations. The variables of the equations are as follows:

$\omega_1$—the speed of the fixed speed generator shaft, known from grid frequency and generator design $\omega_2$—the speed of the variable speed generator is unknown.

$\omega_3$—the speed of the wind driven shaft is known. It is proportional to wind velocity at power levels below rated power. At rated power it is equal to fixed generator shaft speed.

$\tau_1$—the torque of the fixed speed generator is unknown.

$\tau_2$—the torque of the variable speed generator unknown.

$\tau_3$—the torque of the wind driven shaft is known from equation 2.

Since there are three independent equations 6-8 and three unknowns, this set of parameters has a unique solution. For a given wind velocity, equations 6-8 determine the torque that must be applied by the variable speed generator.

The variable speed wind turbine according to the invention can be configured several different ways. One example is based on the following assumptions:

The generators power ratio is 4:1. That is, at rated power, 80% of the power is produced by the fixed speed generator and 20% is produced by the variable speed generator. The cost of the rectifier/inverter converter for this system is five times less than for a single full power variable generator.

An epicyclic variable ratio gearbox with a sun/planet pitch diameter ratio n=1.0

Gearbox and power conditioning electronics are assumed to have 100% efficiency.

Generators typically have low efficiency at low power levels. For this example, it is assumed that generator efficiency is 0% at power output less than 20% of rated power, 100% at power output greater than 20% of rated power.

Referring once again to FIG. 3, a braking system is provided to control the operation of the generators. A first brake 256 is provided on the rotor shaft 210 and a second brake 258 is provided on the shaft 216 to the fixed speed generator. A brake controller 260 controls the operation of the first and second brakes in response to a wind velocity signal from the wind velocity detector 222. When the wind turbine is shut down, the first 256 and second 258 brakes are applied on both the rotor shaft 210 and the fixed speed generator shaft 216. As wind velocity increases from zero, nothing happens until the wind velocity reaches 34% of the rated velocity. At 34% of the rated velocity, the available wind power is 4% of the combined rated power or 20% of the variable generator rated power. As the wind velocity reaches 34% of the rated velocity, the brake controller 260 releases the low speed rotor shaft brake 256. The rotor turns and the variable speed generator 234 is engaged.

The invention functions as a conventional variable speed wind turbine at wind velocities between 34% and 58% of rated wind velocity. The fixed speed generator shaft 216 remains clamped and the fixed speed generator 214 remains disengaged. Within this range the variable speed generator 234 produces 100% of the power. As with conventional variable speed rotors, the rotor shaft torque is controlled in accordance with equation 2 and the rotor speed remains optimum.

At a wind velocity of 58% of the rated velocity, the variable speed generator 234 reaches its maximum rated capacity. The brake controller 260 releases the second brake 258 on the fixed speed generator shaft 216 and the fixed speed generator 214 is engaged. The ratio of power output from the fixed speed generator 214 and the variable speed generator 234 is set by the transformer 252 to be 80:20. The torque controller 230 uses wind velocity data from the detector 222 and an algorithm to control the torque of the variable speed generator 234 through the converter 254 so that the rotor shaft torque is controlled in accordance with equation 2. The rotor speed remains optimum.

At wind velocities above 100% of the rated wind velocity, the total power input by the rotor 204 is limited to rated power by pitch control. In FIG. 3, the pitch control system 224 uses wind velocity data to control blade actuators in the hub 206. At wind velocities above 100% of the rated wind velocity, power remains split, 80% to the fixed generator and 20% to the variable generator. All power, shaft speeds and torque remain constant.

Figure 6:
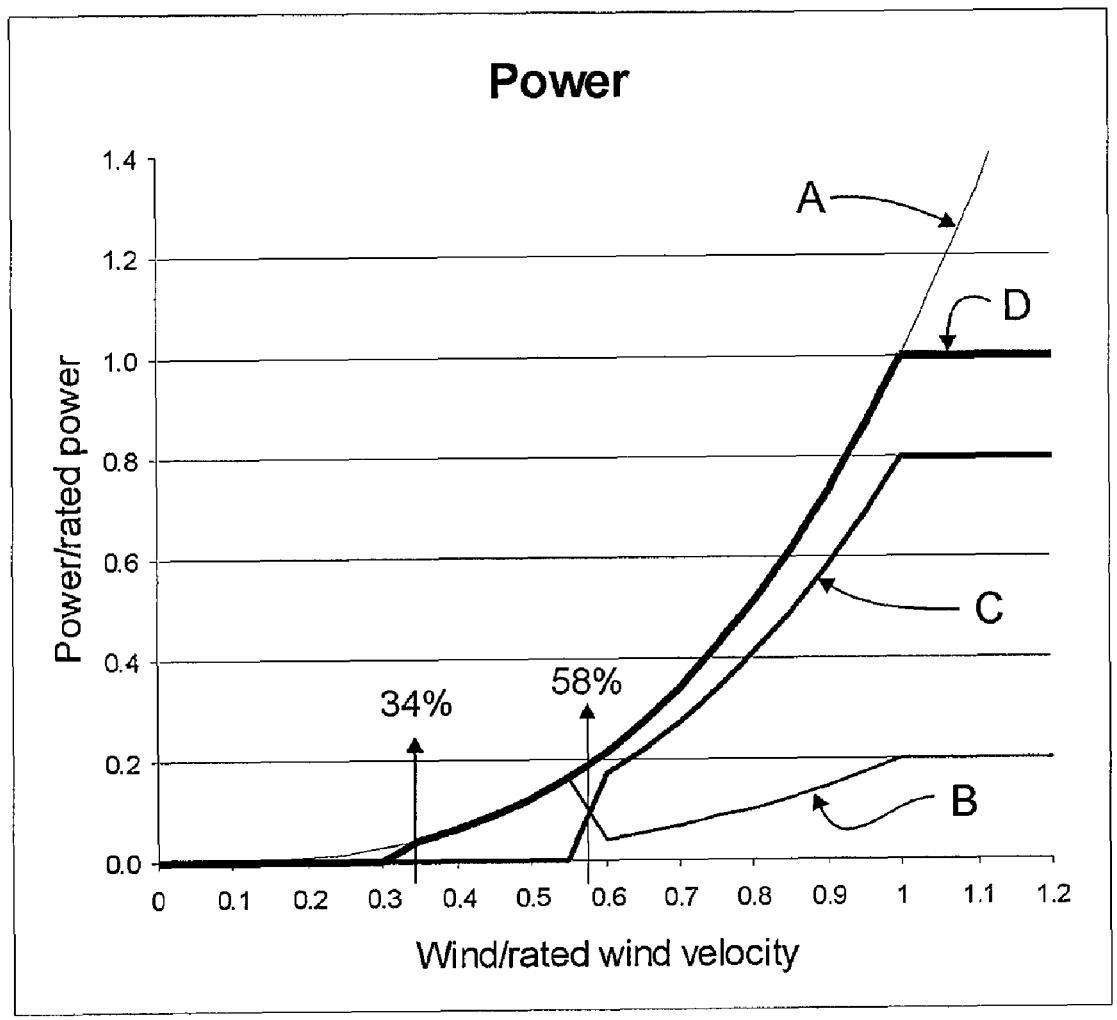
FIG. 6 is a graph showing output power curves from a variable speed wind turbine according to the present invention.

FIG. 6 shows the power curves calculated from equations 6-8 for the above example. Power potentially available from wind increases as the wind velocity is cubed and is shown as curve A. At the rated wind velocity (wind/rated wind velocity=1), available wind power equals the maximum capacity of both generators (power/rated power=1).

Power output from the variable speed generator is illustrated by curve B in FIG. 6. At 34% of rated wind velocity, the variable speed generator is engaged and provides 100% of turbine power until the wind velocity reached 58% of rated capacity. At that point the fixed speed generator is engaged and the power output of the variable speed generator drops to maintain the 80:20 power split. Above 58% of rated velocity, the power output from the variable speed generator continues to increase until it reaches 100% of rated power at the rated wind velocity.

Likewise, power output from the fixed speed generator is illustrated by curve C in FIG. 6. The fixed speed generator is braked until wind velocity reaches 58% of rated velocity at which point the fixed speed generator is engaged. As wind velocity increases, power output continues to increase until the rated power is reached.

Total electric power, i.e. the sum of the power from the variable speed generator and from the fixed speed generator, is illustrated by curve D in FIG. 6. The present invention cuts in at 34% of rated power. A conventional variable speed wind turbine with a single large generator would cut in at 58% of rated wind velocity (at 20% of rated power). The additional wind energy collected between 34% and 58% is unique to the dual generator wind turbine of the present invention.

Figure 7:
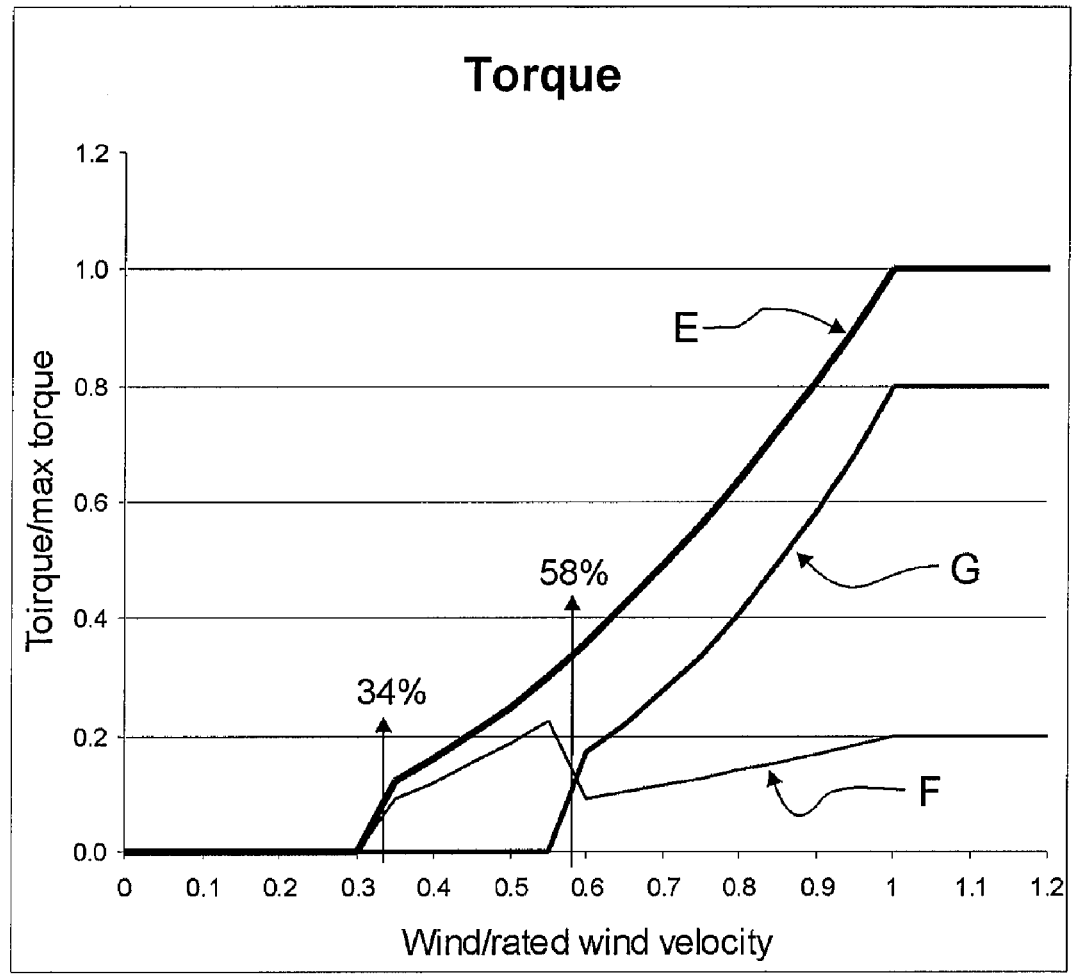
FIG. 7 is a graph showing torque curves for a variable speed wind turbine according to the present invention.

FIG. 7 shows the torque calculated from equations 6-8 for the operation example. Curve E shows torque for the wind rotor shaft, curve G shows torque for the fixed speed generator and curve F shows torque for the variable speed generator.

Figure 8:
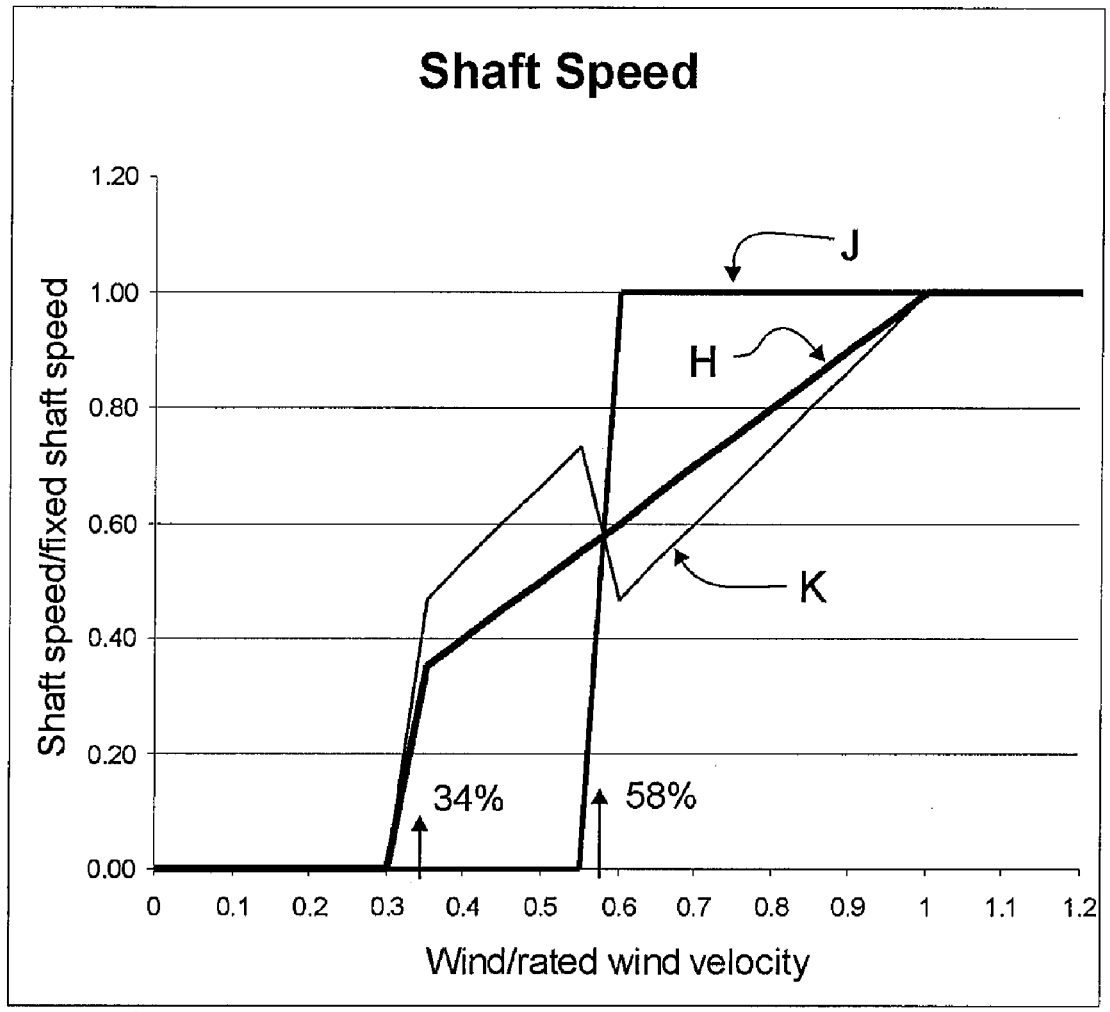
FIG. 8 is a graph showing the rotor shaft speed curves of a variable speed wind turbine according to the present invention.

FIG. 8 shows the shaft rotational speed calculated from equations 6-8 for the operation example. Curve H shows shaft speed for the wind rotor shaft increasing in proportion to wind velocity once the shaft is released at 34% of wind velocity. Curve J shows the rotational speed for the fixed speed generator. Curve K shows the rotational speed for the variable speed generator which is well behaved, that is, the shaft speed does not approach zero with corresponding high torque levels.

A variable speed generator substantially reduces drive train torque fluctuations. A variable speed generator functions like a spring. Wind gusts are translated into rotor accelerations. Energy from a wind gust is temporarily stored as rotor kinetic energy and then released. By this mechanism, dynamic loads of a variable speed generator are significantly less than with a fixed speed generator.

The wind turbine according to the invention has dual generators. The size of the variable speed generator is significantly smaller (by a factor of five in the preceding example) than an equivalent single variable speed generator. As a result, rotational inertia of the variable speed generator is significantly less. Because of its lower rotating inertia, the invention provides a dynamic response superior to a single large variable speed generator.

Dynamic pitch control smoothes energy fluctuations by rejecting energy during wind gust peaks. With pitch control, wind gust energy is never converted into rotational energy. There is a limit to the ability of the pitch control system to perform this function, particularly with short higher frequency wind gusts. Large fixed speed wind turbines with dynamic pitch control still require asynchronous induction generators that use slip to absorb residual torque fluctuations.

With the present invention, the variable speed generator is large enough to provide the torque necessary to control rotor speed. It also is large enough to absorb energy fluctuations from wind gusts. The size of the variable generator is related to the performance of dynamic pitch control. Conversely the variable speed generator simplifies the pitch control design.

While the preferred forms and embodiments of the invention have been illustrated and described, it will be apparent to those of ordinary skill in the art that various changes and modifications may be made without deviating from the inventive concepts set forth above.

What is claimed is:

1. A variable speed wind turbine, comprising
   (a) a rotor including a hub having a longitudinal axis and a plurality of blades connected with said hub and extending radially therefrom;
   (b) a rotor shaft connected with said hub and driven for rotation by said rotor in response to wind striking said rotor blades;
   (c) a variable ratio gearbox connected with said rotor shaft, said variable ratio gearbox having first and second output shafts which rotate at speeds that are not in fixed proportion to the speed of rotation of said rotor shaft;
   (d) a fixed speed generator connected with said first output shaft of said variable ratio gearbox; and
   (e) a variable speed generator connected with said second output shaft of said variable ratio gearbox, said fixed and variable speed generators producing electrical outputs.

2. A variable speed wind turbine as defined in claim 1, and further comprising a power converter connected with the output of said variable speed generator.

3. A variable speed wind turbine as defined in claim 2, wherein said power converter comprises an inverter and a rectifier to convert said electrical output from said variable speed generator to match a frequency of an electrical grid.

4. A variable speed wind turbine as defined in claim 2, and further comprising a transformer connected with said fixed speed generator and said power converter, said transformer defining a power ratio between said generators.

5. A variable speed wind turbine as defined in claim 2, wherein said power converter controls the torque of said variable speed generator.

6. A variable speed wind turbine as defined in claim 2, wherein said power converter controls both the torque and the speed of the variable speed generator.

7. A variable speed wind turbine as defined in claim 2, and further comprising a first brake connected with said rotor shaft and a second brake connected with said first output shaft to said fixed speed generator.

8. A variable speed wind turbine as defined in claim 7, and further comprising a brake controller for controlling the operation of said first and second brakes and a wind velocity detector which produces a wind signal corresponding to the velocity of the wind, said brake controller releasing said first brake when said wind velocity reaches a first level and releasing said second brake when said wind velocity reaches a second level greater than said first level.

9. A variable speed wind turbine as defined in claim 1, and further comprising a fixed ratio gearbox having an input connected with said rotor shaft and an output connected with said variable ratio gearbox.

10. A variable speed wind turbine as defined in claim 1, wherein said variable ratio gearbox includes an epicyclical gearbox.

11. A variable speed wind turbine as defined in claim 10, wherein said epicyclical gearbox includes a sun gear, a ring gear, and a plurality of equally spaced planetary gears arranged between said sun and ring gears.

12. A variable speed wind turbine as defined in claim 11, wherein said epicyclical gearbox further includes a carrier connecting the shafts of said planetary gears.

13. A variable speed wind turbine as defined in claim 12, wherein said planetary gear carrier is connected with said rotor shaft, said ring gear is connected with said variable speed generator, and said sun gear is connected with said fixed speed generator.

14. A variable speed wind turbine as defined in claim 12, wherein said ring gear is connected with said rotor shaft, said sun gear is connected with said variable speed generator, and said planetary gear carrier is connected with said fixed speed generator.

15. A variable speed wind turbine as defined in claim 12, wherein said ring gear is connected with said rotor shaft, said sun gear is connected with said fixed speed generator, and said planetary gear carrier is connected with said variable speed generator.

\* \* \* \* \*